United States Patent
Dholakia (10) Patent No.: US 10,384,962 B1
(45) Date of Patent: *Aug. 20, 2019

(54) METHOD AND APPARATUS FOR FILTERING CONTAMINATED WATER

(71) Applicant: Jayant M Dholakia, Chandler, AZ (US)

(72) Inventor: Jayant M Dholakia, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/813,158

(22) Filed: Nov. 15, 2017

Related U.S. Application Data (63) Continuation-in-part of application No. 14/120,231, filed on May 12, 2014, now Pat. No. 9,884,272.

(51) Int. Cl.
*C02F 1/44* (2006.01)

(52) U.S. Cl.
CPC ........ *C02F 1/444* (2013.01); *C02F 2301/026* (2013.01)

(58) Field of Classification Search
None
See application file for complete search history.

(56) References Cited

U.S. PATENT DOCUMENTS

| | | |
|---|---|---|
| 406,189 A | 7/1889 | Baker |
| 631,128 A | 8/1899 | Ricketts |
| 3,044,628 A | 7/1962 | Heijnis |
| 3,146,189 A | 8/1964 | Kunreuther |
| 3,875,055 A | 4/1975 | Grosboll |
| 3,876,546 A | 4/1975 | Hsiung |
| 3,960,508 A | 6/1976 | Bessant |
| 4,235,724 A | 11/1980 | Ginaven |
| 4,904,456 A | 2/1990 | Anderson |
| 5,024,771 A | 6/1991 | Chiarito |
| 5,281,332 A | 1/1994 | Vandervelde |
| 5,474,586 A | 12/1995 | Eaton |
| 5,492,635 A | 2/1996 | Ball |
| 5,707,527 A | 1/1998 | Knutsen |
| 6,337,025 B1 | 1/2002 | Clemenson |
| 6,533,941 B2 | 3/2003 | Butler |
| 6,649,048 B2 | 11/2003 | de Ridder |
| 7,045,067 B2 | 5/2006 | Brown |
| 7,163,630 B2 | 1/2007 | Chilcote |
| 7,419,591 B2 | 9/2008 | Aberle |

OTHER PUBLICATIONS

Pending Related Patent Application (Unpublished): U.S. Appl. No. 14/120,231, filed May 12, 2014.

*Primary Examiner* — Benjamin M Kurtz (57) ABSTRACT

A method for forming a filter for passing contaminated water using a device and two or more media. The device comprises of one or more elements that are capable of undergoing degradation. The increased area available for flow is obtained by adding a first media to first predetermined areas of the device, adding a second media to second predetermined areas of the device, and allowing the elements to undergo degradation to bring about an increase in the area available for passing the contaminated water.

20 Claims, 6 Drawing Sheets

METHOD AND APPARATUS FOR FILTERING CONTAMINATED WATER

CROSS-REFERENCE TO RELATED APPLICATIONS

This application is a continuation-in-part of application Ser. No. 14/120,231, filed May 12, 2014, now pending.

FEDERALLY SPONSORED RESEARCH

Not Applicable

SEQUENCE LISTING OR PROGRAM

Not Applicable

BACKGROUND

Field of Invention

The present application relates to the treatment of contaminated water such as stormwater runoff, wastewater, and agricultural return flows.

Prior Art

One of the most significant drawbacks of contaminated water treatment systems, such as filtration and infiltration systems, is clogging of the porous media due to buildup of solids, including particles and microbial biomass. As particles become trapped or biomass growth increases, the permeability of the media gradually decreases and eventually the media clogs and is unable to pass the desired flow of contaminated water. Permeability is a measure the ability of the porous media to pass water.

In industrial and drinking water treatment, filters are backwashed periodically to restore hydraulic flow, or other mechanical methods may be used (U.S. Pat. No. 7,163,630). This is not possible in filtration and infiltration practices which operate passively under gravity filtration, such as those used for stormwater and wastewater treatment. Many of these practices incorporate some combination of filter media, hydrodynamic sediment removal, oil and grease removal, or screening to remove floatables and particles that could prematurely blind the filter media. A typical sand filter includes a pretreatment or sedimentation chamber that prolongs filter media life by removing floatables and heavier suspended solids. Soil filters are normally combined with pretreatment such as grass strips or swales, or sediment basins to prevent premature clogging. Dual layer filters in which a coarse grain size media layer is on top of a finer grain size layer is another technique used to prolong the hydraulic life of filters (U.S. Pat. Nos. 7,045,067; 5,281,332; 3,876,546). Ultra-urban filter devices incorporate vertical flows or use relatively coarser media or media in pellet form to prevent premature clogging of the media (U.S. Pat. Nos. 7,419,591; 6,649,048; 5,707,527). In general, the trade off is between using small grain size filter media which improves treatment but results in quicker clogging, and using coarser grain size media which provides poorer treatment but prolongs hydraulic capacity.

In industrial applications, high contact area filter elements are used together with backwashing to prolong the service life of pressurized filtration systems. These elements, called "filter candles", are typically tubular or cylindrical and consist of slotted or perforated material, such as wire mesh or wedge wire, of various slot or opening sizes to suit the application (U.S. Pat. No. 5,474,586). Increasing the filtration area using a removable device has also been proposed for molten polymer filtration (U.S. Pat. No. 3,044,628). Screen filters have recently been proposed in wastewater and stormwater treatment applications (U.S. Pat. Nos. 3,875,055, 4,235,724; 5,492,635; 6,337,025; 6,533,941). Cartridge type filter devices used to treat environmental flows, including stormwater runoff, can also utilize screens both to filter particulates and as a means of directing flows in and out of the individual cartridges (U.S. Pat. Nos. 6,649,048; 5,024,771).

It is established that conventional filtration elements are constructed to be strong and durable, for example by being made of materials such as metals (e.g., stainless steel, aluminum) or plastics such as thermoplastic polymers (e.g., PVC, polypropylene, ABS, nylon). These materials, referred to as "conventional materials", do not undergo significant degradation when exposed to an environment (e.g., microorganisms, light, heat, stress, hydrolysis, oxidation) over tens, hundreds, or more years. Conventional filtration elements are never constructed to be degradable, for example by being made of degradable materials such as degradable polymers or polymer composites, because their degradation results in relatively low strength and durability. The term "degradable material" means a material for which the time span for degradation is substantially shorter than that for conventional materials. Degradation is defined as a process of change in the structure of a material resulting in a significant loss of properties (e.g., integrity, weight, structure, mechanical strength, substance) and/or fragmentation into smaller pieces when exposed to an environment (e.g., microorganisms, light, heat, stress, hydrolysis, oxidation).

It is an object of this new method to improve the service life of filters used for passing (treating) contaminated water such as, but not limited to, stormwater runoff, wastewater, and agricultural return flows. It is also an object of this method to provide some treatment of contaminated water by removing pollutants and particles, to increase volume capture and infiltration, and to increase microbial activity in the media.

SUMMARY

Presented is a device and method for prolonging the service life of contaminated water filters by increasing the area available to pass the contaminated water flow. The increased area for flow is created using two or more media and a specially shaped device that increases the area of media surface that is exposed to the flow. The specially shaped device comprises of elements that are capable of undergoing degradation, such as elements that are made wholly or partly of degradable material. The primary advantage of this method over the prior art is a substantial increase in the area available for flow that is provided by the device, resulting in a reduced rate of clogging of the media and increase in service life.

DRAWINGS

FIG. 1-A Shows a plan view of a configuration of the specially shaped device comprising of hollow elements held together by an open frame.

FIG. 1-B Shows a perspective view of the configuration of the specially shaped device comprising of hollow elements held together by an open frame.

FIG. 2-A Shows a plan view of an alternative configuration of the specially shaped device comprising of hollow elements adjacent to each other.

FIG. 2-B Shows a perspective view of the alternative configuration of the specially shaped device comprising of hollow elements adjacent to each other.

FIG. 4-A Shows use of the specially shaped device for the creation of the high surface area media in an open bed.

FIG. 4-B Shows use of the high surface area media created by the specially shaped device in an open bed.

DETAILED DESCRIPTION

A method is presented for forming a filter using a specially shaped device and two or more porous media. A porous medium is any material or substance containing pores or voids. Preferably, the porous media used with the specially shaped device are granular media. The term "granular media" means a media or material that is in a form that can be poured or added to areas of the device, for example media in the form of granules, fragments, particles, fibers, fines, pellets, chips, powders, flakes, beads, spheres, or filings. The filter formed by the method can be used for passing (treating) contaminated water such as, but not limited to, stormwater runoff, wastewater, and agricultural return flows. Examples of filters formed using the method include granular filters, such as soil filters used to infiltrate contaminated water and sand filters.

The specially shaped device used in this new method comprises of one or more elements of any shape. The elements can be of geometric shapes, organic shapes, or any combination of these. Geometric shapes generally have straight lines and defined angles, and include shapes such as "candles" (e.g., cylindrical, prism, spherical, conical, or other shape) and elongated "fins" (e.g., rectangular, triangular, or other cross-section). Organic shapes are generally more irregular and asymmetrical, and include shapes with no discernable shape (e.g., plant root shapes). The elements of the device are parts of the device that provide the desired increase in area available to pass the contaminated water flow. The elements of the device can be any of a large variety of predetermined shapes and sizes, and can be solid or hollow. The elements and the areas between elements can be hollow or open so that media can be added to or into the elements and areas between elements. The term "hollow" or "open" means completely or sufficiently hollow to allow media to be added to predetermined areas. An example of hollow elements is hollow cylindrical elements that have sufficient space to allow addition of media into them. Another example is solid fin elements that provide hollow or open areas between them to allow addition of media. The term "added to" and similar terms "added into", "adding to", and "adding into" mean that media can be added to or into predetermined areas such as into the elements themselves or the areas surrounding the elements, for example by pouring the media or pushing the hollow elements into the media.

Preferably, the device is fabricated in the form of modules, each module comprising of one or more elements. Depending on needs, a plurality of modules can be placed and positioned prior to addition of media. An alternative to a fabricated device is a one where the device is "formed" from prefabricated components of predetermined size and shape that are placed and positioned together prior to adding the media. The device formed in this way can comprise of unattached components placed together or can comprise of components attached by any means, for example by connecting or interlocking, for increased rigidity. An example is a cylindrical element device formed from two semi cylindrical element components that have been placed and positioned together on top of media. Another example is a device comprising of two components—one component with hollow elements and the second with solid elements that fit into the hollow elements. In this example, a media is added around the elements, the second component with solid elements is removed, and a second media added to the now hollow elements of the first component. The term "device" refers to a prefabricated device or a formed device comprising of components that are placed and positioned in place to create the device. The term "elements" refers to elements that are prefabricated or elements that have been formed from components that are placed and positioned in place prior to addition of media.

The elements of the device can be configured in any number of different ways. These include, but are not limited to, elements that are adjacent to each other, elements that are nonconcentric, elements that are concentric, elements that have nonconcentric elements within, or some alternative configuration. The elements can be adjacent to each other or attached to each other by one or more support members that can be rigid (any material) or flexible (for example, ropes or ties made from nylon or other material). The support members can form an "open frame" so that during installation a media can be introduced into predetermined areas formed by the frame. The term "open frame" means completely or sufficiently open to allow media to be added to predetermined areas. Another configuration is one where the elements are adjacent to and attached to each other and the elements themselves provide the "open frame" for the device. In this configuration, media can be introduced into adjacent elements and/or the open spaces between the elements. For example, a first media could be added into predetermined elements and a second media into other predetermined elements that are adjacent and/or areas between elements that already have the first media. This configuration can enable a relatively denser packing of the elements, and therefore provide a relatively greater area available for flow per unit footprint area of the device than the alternative configuration with frame members. Another alternative configuration is a device with one or more nonconcentric elements attached to a plurality of support members. In this configuration, the increased area available for flow (i.e. high surface area) can be provided by pouring one media into the elements and another media around the outside of the elements. Another example is a main hollow cylindrical element that has secondary concentric cylindrical elements within. In this configuration, the high surface area can be provided by pouring one media between alternate annular spaces and the second media into the remaining annular spaces in between. An alternative to this concentric configuration is a circular form of the device with nonconcentric elements. The concentric configuration and the circular form of the nonconcentric configuration are expected to be particularly beneficial in cartridge-type treatment units. Yet another example is a configuration with fin elements, such as parallel fins of rectangular cross-section. In this configuration, a media can be added to alternate spaces between the fin elements and another media in the remaining spaces in between.

The size of the elements and number of elements per unit area of device can depend on a number of factors, including the severity of the clogging problem, method of degradation, need for ease of installation, area of filter, depth of filter, and media type. Preferably, the width of the elements (or diameter for cylindrical elements) is in the range of about 1 to 10 inches, or more preferably in the range of about 1 to 6 inches, or even more preferably in the range of about 1 to 4 inches. The surface or contact area of the elements can vary depending on the application. The surface or contact area is the area of the elements that is expected to be in contact with a media. Preferably, the surface area of the elements is at least 2 times the footprint area occupied by the elements, or more preferably at least 5 times the footprint area occupied by the elements, or even more preferably at least 10 times the footprint area occupied by the elements. The footprint area is the base area of the elements. The surface area of a solid fin element can be assumed to be the surface area of one side of the fin element. The size and surface area of the elements can vary element to element, and elements can have variable size and no discernable shape. For example, variable size elements can be used with organic shapes such as dendritic or root shape. The size and surface area of the elements is not limited to these preferred ranges or values, but is selected depending on, for example, the severity of the clogging and need for ease of installation. If the need to prevent premature clogging is more important, than a device with elements of relatively higher surface area can be used, while a device with elements of surface area closer to about two times their footprint area may be preferred for ease of installation. For example, for cartridge type filters even smaller than 1 inch element width may be preferred because of the limited filter area of the cartridge filter.

The device can be of material that is solid, perforated, or a combination of the two. Perforated material is material that is not solid, and contains perforations such as holes, slots or other openings. For example, the elements and frame of the device can be solid, or the frame can be solid but the elements are perforated, or the elements are a composite of conventional perforated material wholly or partly covered by degradable material. An advantage of solid material is increased rigidity during installation. Another advantage is intermixing of media is avoided during installation since there are no perforations through which media particles can mix or the performations are too small to allow media to mix. In the case of elements made of composite material, the conventional material, for example a conventional screen, can provide the increased rigidity while the degradable material can block the openings during installation to avoid mixing of media. Degradation of the degradable material results in opening of the perforations in the conventional material and increase in the area available to pass the contaminated water flow. Use of perforated material can reduce the amount of material required for constructing the device, increase the rate of degradation of the elements since relatively less material is required to be degraded, and can also be beneficial when the degradation of the elements is expected to occur relatively slow. The elements of the device can also be corrugated for increased strength and rigidity. An example is a device made of star-shaped corrugated, biodegradable plastic elements. Another example is a device with elements made of corrugated wood pulp material, such as corrugated fiberboard, corrugated cardboard, or corrugated paperboard.

To facilitate addition of media, the device can have predetermined open areas covered with conventional or degradable material. This may be desirable because it allows media to be efficiently added to predetermined areas while preventing addition to other predetermined areas. The cover can be flat or it can be shaped in such a way that the added media does not accumulate on top of the predetermined areas, for example by having conical tops. A degradable cover can be manually degraded or allowed to degrade over time. For example, a hydrolytically degradable cover could be used that degrades within about an hour following exposure to water. Another example is when the second media is added on top of the degradable cover and the cover is allowed to degrade over time so that the second media "falls into" the hollow areas below. The degradable cover can degrade relatively faster or can be manually degraded relatively faster than the elements themselves.

To facilitate easier installation, the device can be modular with sections that can be placed or snapped together, or attached by flexible supports and rolled out over the filter. The frame of the specially shaped device can be made of any material, such as degradable material or conventional material. Use of conventional frame material can provide increased strength and durability that may be required. In applications where traffic rating is required, for example treatment practices that are adjacent to roadways, the device can comprise of a non-degradable frame structure that can be left in the filter layer to provide the traffic rating required. This frame structure can be designed to provide the traffic rating but not restrict flow through the newly created high surface areas.

The elements of the device are capable of undergoing degradation. The term "capable of undergoing degradation" and similar terms such as "capable of degrading" used elsewhere mean capable of a significant change in properties (e.g., integrity, weight, structure, mechanical strength, substance, composition) and/or fragmentation into smaller pieces when exposed to an environment (e.g., microorganisms, light, heat, stress, hydrolysis, oxidation). The term "significant change in properties" means a change in properties that is sufficient to produce the desired result of increasing the area available to pass the contaminated water. Preferably, the elements of the device are allowed to undergo degradation prior to the expected failure due to clogging of the intermediate media (media with the installed device). The term "allowed to undergo degradation", and similar terms such as "allowing the elements to degrade" used elsewhere, mean that the elements or degradable materials used for the elements are allowed to undergo degradation through processes that result from the environment they are placed in, and includes processes that are induced manually. The term "expected failure due to clogging" means a deterioration in the ability of the media to pass the contaminated water to the extent that it no longer passes the desired flow rate. For example, the time span for expected failure can be assumed to be about 5 years after installation for an intermediate media that is expected to be incapable of passing a design or regulatory filtration rate or infiltration rate after about 5 years of use. Another example is a time for expected failure of about 3 years for an intermediate media that is expected to have substantial head loss or overflows after about 3 years of use. The time to expected failure can be estimated using a number of different ways. For example, it can be estimated from previous applications of the new method or knowledge of failure times for the "unimproved" media (the media for which the increase in area is desired).

Preferably, the elements of the device are made wholly or partly of degradable material, such as degradable polymer material or degradable composite material. The term "degradable material" means a material for which the time span for degradation is substantially shorter than that for conventional materials. Preferably, the degradable material for the elements is selected so that the desired degradation is achieved before expected failure due to clogging of the intermediate media (media with the installed device). For example, it may be desirable to achieve degradation during or shortly after installation, or in about a few days or weeks after installation when the device is used in situations where loading rates are relatively high and failure due to clogging is expected to occur within about a month or two months. In these cases, the degradable material can be one that can be manually degraded or that readily degrades in the environment it is expected to be exposed to. In another example, a material that is capable of undergoing degradation after about a year or two may be sufficient for situations where the loading rates are relatively low and failure due to clogging is not expected to occur for three or four years. A degradable material that is capable of degrading within about 10 years following installation is expected to be sufficient for most, but not all, applications.

Preferably, the elements are capable of being in the range about 50 to 100 percent, or more preferably in the range about 80 to 100 percent, or even more preferably in the range about 90 to 100 percent, degraded after installation of the device. The terms "about 50 percent", "about 80 percent", or "about 100 percent" mean that, after installation, about 50 percent, or about 80 percent, or about 100 percent of the element material can be degraded essentially to basic chemical units such as monomers or small oligomers, or into small fragments, particles, or other granular material. Preferably, the elements are capable of degrading in the range about 50 to 100 percent, or more preferably in the range about 80 to 100 percent, or even more preferably in the range about 90 to 100 percent, within about 10 years after installation, and more preferably within about 5 years after installation, and even more preferably within about one year after installation of the device. If desired, even more rapid degradation, for example during installation or within about a few hours, days, or weeks following installation of the device, can be induced by manual means (e.g., adding water to facilitate degradation of elements made of material that can be degraded hydrolytically). The ranges for the degree of degradation and time span of degradation are not limited to the preferred ranges.

Degradable materials that can be used for the elements of the device can be natural, synthetic, or any combination of the two, and can be capable of degrading by any number of processes, including, but not limited to, biodegradation, photodegradation, hydrolytic degradation, thermal degradation, oxidative degradation, mechanical degradation, or any combination of these. A biodegradable material, such as a biodegradable polymer or polymer composite, is a material that can degrade owing to the action of micro- and/or macroorganisms or enzymes. The rate of biodegradation can vary depending on the nature of the functional group and degree of complexity. Biodegradation processes can occur in a number of ways, including, but not limited to, processes that result in mechanical damage, direct enzymatic effects leading to breakdown of the material structure, and secondary biochemical effects caused by excretion of substances that can directly affect the material or change environmental conditions, such as pH or redox conditions. Microorganisms produce enzymes that catalyze reactions by combining with a specific substrate or combination of substrates. A photodegradable material, including a photodegradable polymer, is a material in which degradation results from the action of light such as daylight or sunlight. A hydrolytically degradable material, including a hydrolytically degradable polymer, is a material in which degradation results from hydrolysis. A thermally degradable material, including a thermally degradable polymer, is a material which degrades when heated or when exposed to relatively high temperatures. An oxidatively degradable material, including an oxidatively degradable or oxo-biodegradable polymer, is a material in which degradation results from oxidation. A mechanically degradable material is one that breaks down relatively easily when force is applied.

There are a large and growing number of materials that are degradable materials that can be used to produce the degradable elements or can be used as additive, fillers, binders or catalysts to produce degradable elements. Degradable materials can be natural materials, synthetic materials, or a combination of the two, and include, but are not limited to, proteins (e.g., wheat, soy, zein), polysaccharides (e.g., chitin, cellulose, starch, dextran, xanthan, pectin, alginate), and polymers (e.g., degradable polyesters, degradable PP, PGA, PLA, PHA, PHB, PCL, PVOH, EVOH, PBS/PBSA polyesters, PEF, biodegradable PET, copolyesters, polyvinyl alcohol, polyamides, Biomax®, Biopol®, polyurethanes, polyolefins, modified PET, degradable polypropylene), as well as blends of these and other materials. Increasingly, additives are added to conventional polymers and degradable polymers to impart controlled degradation behavior (e.g., catalytic transition metal compounds such as cobalt stearate or manganese stearate). Degradable materials that are composites are materials that are made from two or more materials that are different, for example materials with different degradation behavior because of different compositions, properties, or structure. Composite materials can include materials with both conventional and degradable components, for example a material with conventional or relatively low degradation rate particles bonded together by a degradable resin or bonding agent.

The actual time to achieve degradation of the elements will vary depending on, for example, the materials used, the dimensions of the elements, and the environmental conditions. The rate and manner of degradation of the elements is affected by a number of factors, including, but not limited to, temperature, availability of oxygen or lack of it, burial and depth of burial of the product, humidity or wetness, rainfall, size, weight, surface area of elements, element composition, including polymer type, molecular weight, crystallinity, orientation, surface-to-volume ratio, pH, and environment in which the elements rest. For example, elements made of hydrolytically degradable material may degrade readily within about an hour or a few hours after exposure to water. The elements of the device can be made of a conventional material providing that they are capable of undergoing degradation prior to the expected failure due to clogging. For example, the elements can be made of a conventional material such as PVC or ABS that is sufficiently thin that it is capable of undergoing degradation prior to expected failure, or they can be made of conventional material that is designed to undergo degradation induced mechanically during installation (e.g., stress introduced by a soil roller or soil compaction equipment). The degradation time can be relatively short where clogging is expected to occur relatively fast, or where the benefit of increased infiltration and volume capture is desired quickly following installation. Elements that are capable of undergoing degradation within about 10 years following installation are expected to be sufficient for most, but not all, applications.

The elements of the device can undergo degradation when they are exposed to the surrounding environment, for example when they are buried in soil or other media. Degradation can also be induced or the rate of degradation can be increased by manually inducing the degradation. The term "manually inducing" means manipulating the surrounding environment in order to bring about the desired degradation. An example of manually inducing degradation is introducing water to bring about degradation of hydrolytically degradable material. Another example is to provide heat to bring about degradation of thermally degradable material. Manually induced degradation may be desirable because it allows greater control over the rate of degradation. Degradation rates can be based on actual times of degradation for degradable materials in similar environments or based on measurements from a variety of short- or long-term tests including, but not limited to, environmental chamber tests in which the temperature and humidity of the environment can be manipulated, water tests, microbiologically active tests (such as the aerobic and anaerobic tests recommended by ASTM), and composting tests that simulate soil degradation. There are a wide variety of United States and International tests available, such as ASTM and ISO tests for biodegradable and compostable materials. The present method is not necessarily limited to materials that are classified as degradable using one or more of these tests. It is desirable that the elements have sufficient balanced degradability characteristics such that they degrade rapidly enough in the environment in which they are placed to provide the increased area that is desired, yet slowly enough that they will not degrade during normal shelf life, storage or shipment time periods, and during addition of media.

The specially shaped device is used with two or more porous media. Preferably, the porous media are granular media. The porous media used can be natural media, manufactured media, or a combination of the two. For example, the first media can be the media for which the increased area for flow is desired while the second media can occupy predetermined areas of the device, such as inside the elements of the device or the spaces around the elements, and prevents the newly created high area surfaces from collapsing when the elements of the device degrade. The two or more media differ in one or more properties that affect permeability or the rate of change in the permeability due to clogging, such as physical properties or composition. For example, the second media can be coarser than the first media, or of larger particle size, or more uniform particle size distribution. The first and second media can be different based on, but not limited to, differences in particle size or particle size distribution, particle shape, proportion of fine particles, uniformity coefficient, porosity, pore size, pore size distribution, composition, surface properties, or any combination of these. A specific example is a first media that is a soil and a second media relatively coarser bioretention soil (engineered soil) or a wood-based media such as mulch. Engineered soils include, but are not limited to, soils created by mixing sand and compost, soil and compost, sand and mulch, or any combination of other media. Another example is fine sand as the first media and relatively coarser sand as the second media. Yet another example is a manufactured media such as perlite or expanded shale as the first media and sand as the second media. There are a large number of media and media mixes that could be used as either the first media or the second media. Media that can be used include, but are not limited to, sand, gravel, soil, engineered soil, perlite, limestone, dolomite, activated carbon, activated alumina, iron oxide, coated sand, compost, expanded shale, expanded slate, and peat.

The media can be added to areas of the device in any order. For instance, the first media is added first to predetermined areas and is followed by the second media into other predetermined areas, or the second media is added first to predetermined areas and is followed by the first media in other predetermined areas. As a specific example, a first media is added to first predetermined areas outside of hollow elements and is followed by a second media added to second predetermined areas inside the hollow elements. Another example is a first media added to first predetermined areas between solid fin elements and is followed by a second media added to second predetermined areas that are adjacent to the first predetermined areas.

Depending on the material used for the elements, the dimension of the elements, the environment it is exposed to, and/or other factors, the elements of the device may undergo complete degradation, resulting in contact between the first and second media, or they may undergo partial degradation into granular media that allows flow to pass through it, but no contact between the first and second media. For example, elements made from a degradable polymer could degrade within a period of time into basic chemical units and result in contact between the first and second media. Alternatively, elements made of a composite material that is partially degradable could degrade into granular media and allow flow to pass through the resulting porous media between the first and second media. Another example is elements made of conventional material that can undergo degradation into granular media (e.g., small pieces) when exposed to mechanical stress.

Figure 1:
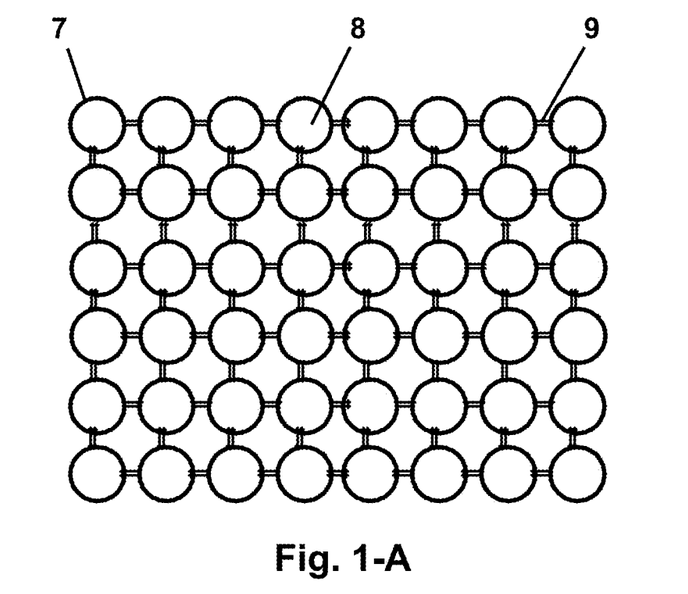

FIGS. 1-A and 1-B show plan and perspective views of a device configuration comprising of nonconcentric elements. In the configuration shown, the device 7 comprises of hollow elements 8 held together by open frame 9. The elements 8 are capable of undergoing degradation, for example by being made of degradable material such as a degradable polymer or polymer composite, so that the desired increase in area available for flow is provided when the elements undergo degradation. Frame 9 can be degradable material or conventional material.

Figure 2:
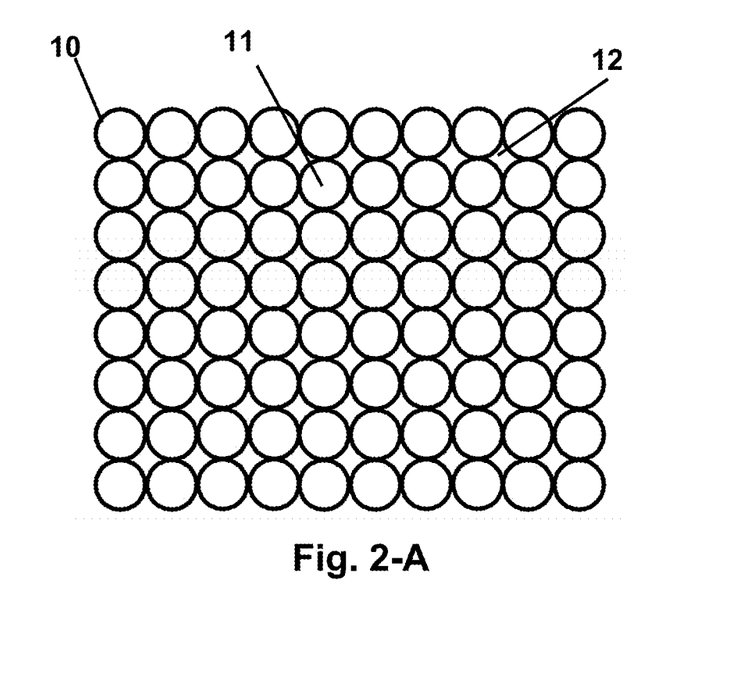

FIGS. 2-A and 2-B show plan and perspective views of a device configuration comprising of elements that are adjacent to each other. The device 10 shown in FIGS. 2-A and 2-B comprises of hollow elements 11 that are adjacent to each other, with the elements themselves forming the "open frame" 12. The elements 11 are capable of undergoing degradation, for example by being made of degradable material such as a degradable polymer or polymer composite, so that the desired increase in area available for flow is provided when the elements undergo degradation.

Figure 3:
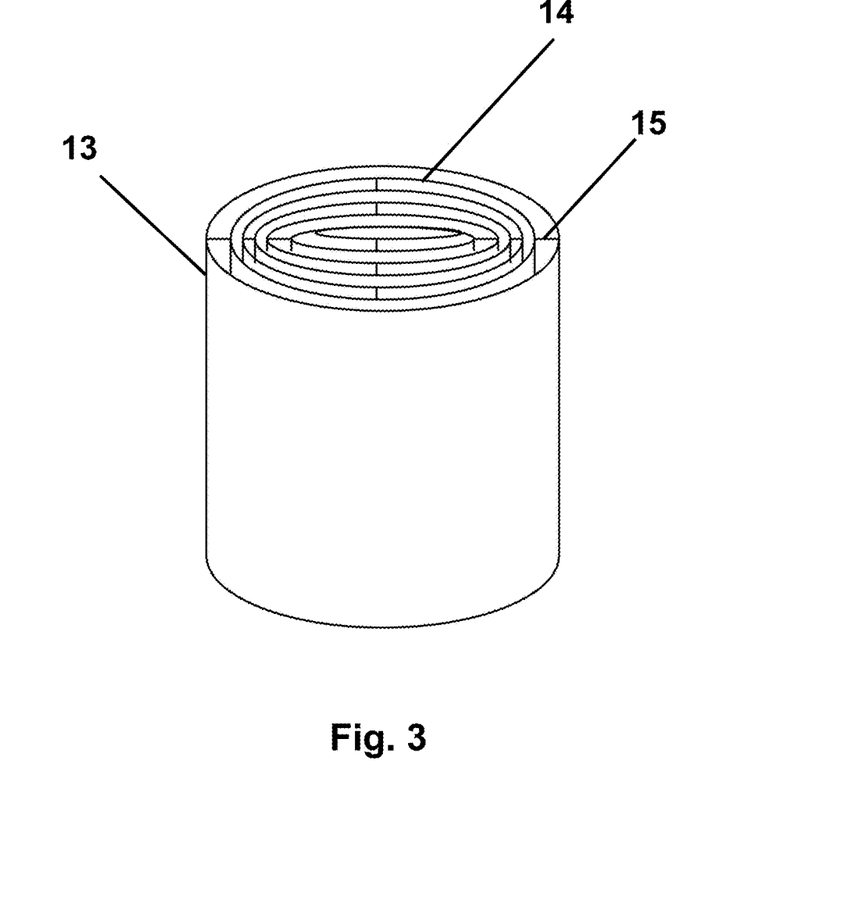
FIG. 3 Shows a perspective view of an alternative configuration of the specially shaped device comprising of concentric elements.

FIG. 3 shows a typical concentric configuration of the device. In this configuration, device 13 comprises of hollow elements 14 that are concentric to each other and are attached by an open frame 15 that allows media to be poured between adjacent elements. The elements 14 are capable of undergoing degradation, for example by being made of degradable material such as a degradable polymer or polymer composite, so that the desired increase in area available for flow is provided when the elements undergo degradation. Frame 15 can be made of degradable material or conventional material.

In one embodiment, a modular device made of hollow degradable elements held together by an open frame is used to increase the media area available to pass flow. In this embodiment, the device (elements and frame) are made wholly of degradable material selected so that degradation is expected to occur within about 5 years following installation of the device. Two different granular media are used in this embodiment. The first media is the media for which the increased area for flow is desired. The second media has different properties, for example it is coarser than the first media, has larger pore size, or of more uniform size or pore size distribution, or of different composition or shape. Following addition of the media, the elements of the device are allowed to degrade and increase the area available for to pass the flow.

Figure 4:
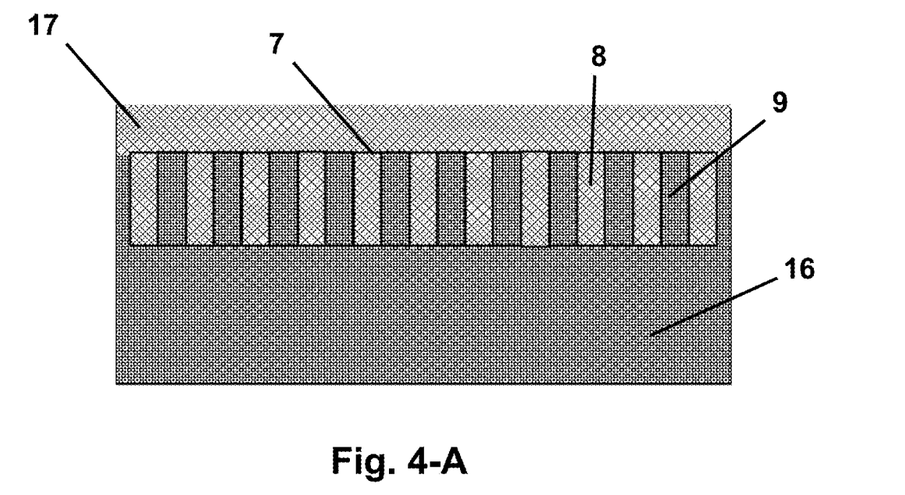

FIG. 4-A shows an example use of the device to create the desired increase in flow area in an open media bed. In FIG. 4-A, the device 7 is placed on top of the first media 16. The first media 16 is added into first predetermined areas 9. During this stage the openings to the tops of adjacent second predetermined areas 8 can be closed, for example by a cover that is made of either conventional or degradable material. Closing the tops of second predetermined areas 8 allows the rapid and efficient introduction of the first media 16 by preventing the first media from entering areas that are for the second media. The second media 17 is then added to second predetermined areas 8, after removal or degradation of any cover that may be present. When a degradable cover is present, degradation of the cover will allow the addition of media into the underlying areas. For example, a cover made of hydrolytically degradable material can be manually degraded by exposure to water prior to addition of the second media. Although not required to be, the first media 16 can be completely covered by a layer of second media 17 which then acts as a pretreatment media that provides some treatment of flows before they enter the first media 16. The layer of second media 17 also prevents access to mosquitoes when standing water is present in the high surface area regions 19 shown in FIG. 4-B. Following installation of the device and media, the elements are allowed to degrade to increase the area available for flow. FIG. 4-B shows an example use of the high surface area media created by the embodiment after installation and degradation of device 7. The degradation of device 7 can occur when it is exposed to the environment or it can be induced (e.g. hydrolytically by introducing water, thermally by heating, or other means appropriate to the type of degradable material used). In FIG. 4-B, contaminated water enters the second media 17, and passes into first media 16 at the interface between the media, including the interface 18 between the two media in high surface area regions 19. It then travels through the bulk of first media 16.

Figure 5:
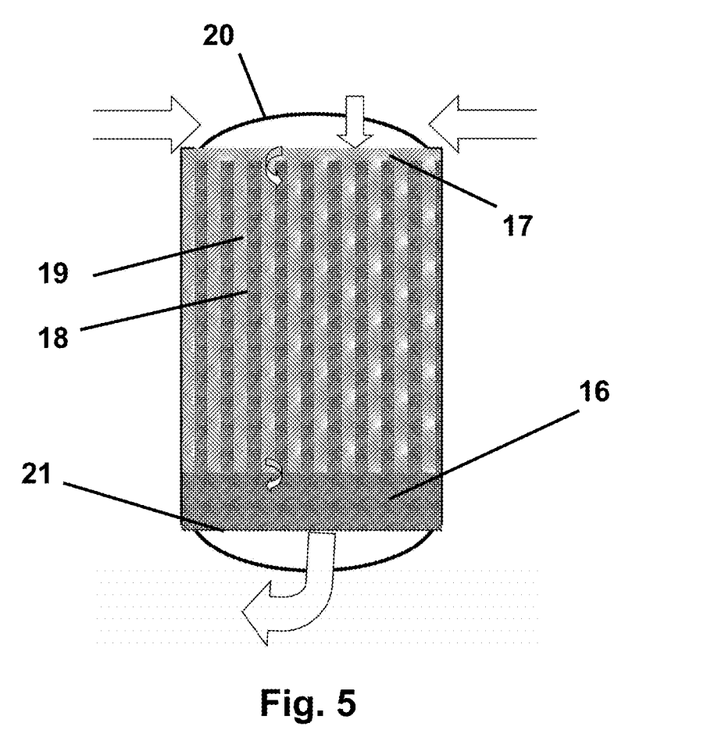
FIG. 5 Shows use of the high surface area media created by the specially shaped device in a cartridge filter operating in downflow mode.

FIG. 5 shows an example use of the high surface area media created by a concentric configuration of the device in a cylindrical cartridge-type treatment unit operating in downflow mode. The high surface area shown for first media 16 is created using the process outlined in FIGS. 4-A and 4-B but instead using device 13 in FIG. 3 and adding media into alternate annular spaces created by the concentric elements. In FIG. 5, device 13 has degraded following installation and is not shown. Flows enter the treatment unit 20 near the top. Flows may enter second media 17 before first media 16 if second media 17 completely covers first media 16. The flows pass into first media 16 at the interface between the media, including the interface 18 between the two media in high surface regions 19. Treated flows leave treatment unit 20 through media support 21.

Figure 6:
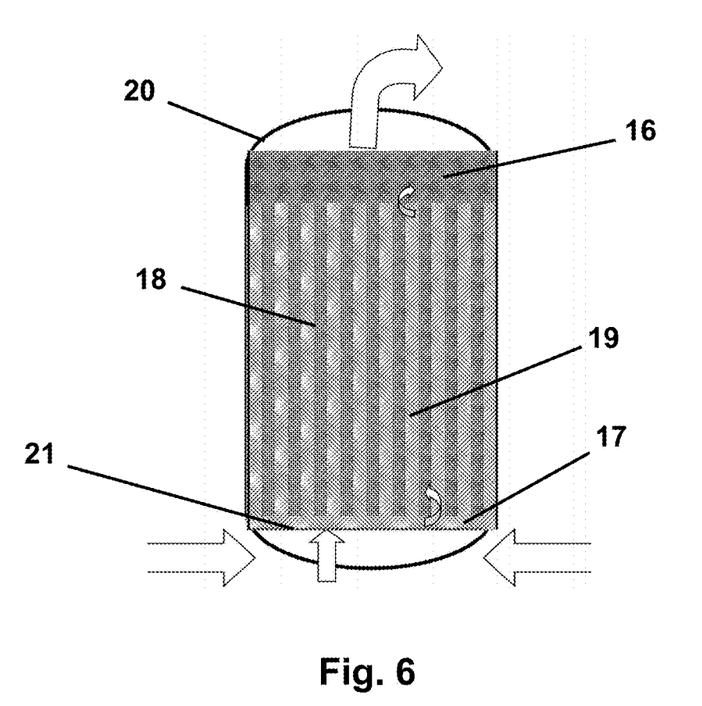
FIG. 6 Shows use of the high surface area media created by the specially shaped device in a cartridge filter operating in upflow mode.

FIG. 6 shows an example use of the high surface area media created by a concentric configuration of the device in a cylindrical cartridge-type treatment unit operating in upflow mode. The high surface area shown for first media 16 is created using the process outlined in FIGS. 4-A and 4-B but using device 13 in FIG. 3 and adding media into alternate annular spaces created by the concentric elements. In this mode, treatment unit 20 can be turned upside down to facilitate installation of the media and device 13. In FIG. 6, device 13 has degraded following installation and is not shown. Flows enter the treatment unit 20 near the bottom, and enter second media 17 through media support 21. Flows may enter both first media 16 and second media 17 when a layer of second media 17 is not used on support 21. Flows pass into first media 16 at the interface between the media, including the interface 18 between the two media in high surface regions 19. Treated flows leave treatment unit 20 near the top. There are a number of alternative flow directions that could be utilized in cartridge-type treatment units, for example flows entering through perforations on the sides of the treatment unit 20 and then flowing to the top or bottom of treatment unit 20 before passing through the high surface area media.

In FIG. 4-B, FIG. 5, and FIG. 6, the interface shown following degradation of the elements is that between the first media and the second media. If the elements of the device are made of a degradable or composite material that is only partially degradable, degradation can result in a third granular media that separates the first and second media. This third granular media allows flow to pass through it as it travels between the first and second media.

The specially shaped device can be configured in a number of alternative ways and can be used in a number of different situations. From the description above, a number of advantages of this new method for forming a filter become evident:

(a) The method involves use of a device that increases the surface area available for passing contaminated water through a porous media, and can increase the area of media exposed to cross-flow filtration. This reduces the rate of clogging and the need for frequent maintenance, and directly reduces operating costs.

(b) The method involves use of a device that can be modular, and therefore easily installed in contaminated water treatment practices such as infiltration systems and media filters.

(c) The method involves use of device that can be manufactured from readily available materials, such as biodegradable polymers. Materials that both degrade relatively quickly and do not harm the environment can be used with the method.

(d) The improved service life provided by the method over traditional media filters increases flexibility in the design of contaminated water practices. Contaminated stormwater, wastewater, and agriculture treatment practices could be made smaller and operated at higher loading rates because the method is less prone to clogging. This is especially beneficial in urban areas, where space for installation of such practices is often constrained.

(e) The high surface area regions created by the method will increase the volume capture of contaminated water since each such region acts as a micro "infiltration basin" capable of capturing and holding the water. In the case of stormwater treatment, this is particularly beneficial during relatively higher precipitation storm events when runoff would otherwise sheet flow over the stormwater practice. The high surface area regions will also increase microbial activity because of the relatively longer periods of water availability and due to the process of degradation of the elements.

(f) The method involves use of a device that, in one alternative, provides reinforcement for withstanding traffic loads for installations adjacent to roadways. This is achieved by use of conventional high strength materials for the frame of the device.

Although the description above contains specificities, these are not to be seen as limiting the scope of the new method but as merely providing illustrations of some of the expected common alternatives and embodiments. Thus, the scope of the new method should be determined by the appended claims and their legal equivalents, rather than by the examples given.

The invention claimed is:

1. A method for forming a filter for passing contaminated water, said method comprising: providing a device which comprises of one or more elements that are capable of undergoing degradation, adding a first media to first predetermined areas of said device, adding a second media to second predetermined areas of said device, and allowing said one or more elements to undergo degradation to bring about an increase in area available to pass said contaminated water.

2. The method of claim 1, wherein said first media and said second media have different particle size, particle size distribution, particle shape, proportion of fine particles, uniformity coefficient, porosity, pore size, pore size distribution, composition, or surface properties.

3. The method of claim 1, wherein said one or more elements are of predetermined size and shape.

4. The method of claim 1, wherein the step of allowing said one or more elements to undergo degradation is accomplished by manually inducing degradation.

5. The method of claim 1, wherein the surface area of said one or more elements is at least two times the footprint area of said one or more elements.

6. The method of claim 1, wherein predetermined areas of said device are covered with degradable material.

7. The method of claim 1, wherein said elements are made wholly or partly of degradable material selected from the group consisting of biodegradable polymers, photodegradable polymers, hydrolytically degradable polymers, thermally degradable polymers, oxidatively degradable polymers, mechanically degradable polymers, biodegradable polymer composites, photodegradable polymer composites, hydrolytically degradable polymer composites, thermally degradable polymer composites, oxidatively degradable polymer composites, mechanically degradable polymer composites, and combinations thereof.

8. A method for forming a filter for passing contaminated water, said method comprising: providing a device which comprises of one or more degradable elements that following installation are capable of degrading within a desired time period that is based on environmental chamber tests, adding a first media to first predetermined areas of said device, adding a second media to second predetermined areas of said device, and allowing said one or more elements to degrade to bring about an increase in area available to pass said contaminated water.

9. The method of claim 8, wherein said first media and said second media have different particle size, particle size distribution, particle shape, proportion of fine particles, uniformity coefficient, porosity, pore size, pore size distribution, composition, or surface properties.

10. The method of claim 8, wherein said elements are made wholly or partly of degradable material selected from the group consisting of biodegradable polymers, photodegradable polymers, hydrolytically degradable polymers, thermally degradable polymers, oxidatively degradable polymers, mechanically degradable polymers, biodegradable polymer composites, photodegradable polymer composites, hydrolytically degradable polymer composites, thermally degradable polymer composites, oxidatively degradable polymer composites, mechanically degradable polymer composites, and combinations thereof.

11. The method of claim 8, wherein the step of allowing said one or more elements to degrade is accomplished by manually inducing degradation.

12. The method of claim 8, wherein the surface area of said one or more elements is at least two times the footprint area of said one or more elements.

13. The method of claim 8, wherein said one or more elements are of predetermined size and shape.

14. The method of claim 8, wherein predetermined areas of said device are covered with degradable material.

15. The method of claim 8, wherein said desired time period is about 10 years.

16. The method of claim 8, wherein said desired time period is about 5 years.

17. A method for forming a filter for passing contaminated water, said method comprising: providing a device which comprises of one or more elements that are made wholly or partly of hydrolytically degradable material, said hydrolytically degradable material selected so that said one or more elements are capable of degrading following addition of water, adding a first media to first predetermined areas of said device, adding a second media to second predetermined areas of said device, and allowing said one or more elements to degrade by adding water to bring about an increase in area available to pass said contaminated water.

18. The method of claim 17, wherein said first media and said second media have different particle size, particle size distribution, particle shape, proportion of fine particles, uniformity coefficient, porosity, pore size, pore size distribution, composition, or surface properties.

19. The method of claim 17, wherein the surface area of said one or more elements is at least two times the footprint area of said one or more elements.

20. The method of claim 17, wherein predetermined areas of said device are covered with degradable material.

* * * * *